United States Patent
Hartl et al.

(10) Patent No.: US 11,150,060 B2
(45) Date of Patent: *Oct. 19, 2021

(54) RING-SHAPED OR PLATE-LIKE ELEMENT AND METHOD FOR PRODUCING SAME

(71) Applicant: Schott AG, Mainz (DE)

(72) Inventors: Helmut Hartl, Vienna (AT); Thomas Pfeiffer, Kumhausen (DE)

(73) Assignee: Schott AG, Mainz (DE)

(*) Notice: Subject to any disclaimer, the term of this patent is extended or adjusted under 35 U.S.C. 154(b) by 250 days.

This patent is subject to a terminal disclaimer.

(21) Appl. No.: 15/866,084

(22) Filed: Jan. 9, 2018

(65) Prior Publication Data

US 2018/0156582 A1    Jun. 7, 2018

Related U.S. Application Data

(60) Division of application No. 14/635,030, filed on Mar. 2, 2015, now Pat. No. 9,885,548, which is a
(Continued)

(30) Foreign Application Priority Data

Sep. 17, 2010 (DE) .................. 10 2010 045 624.1
Sep. 17, 2010 (DE) .................. 10 2010 045 641.1
Aug. 19, 2011 (EP) ...................................... 11006788

(51) Int. Cl.
*F42B 3/103* (2006.01)
*F42B 3/195* (2006.01)
(Continued)

(52) U.S. Cl.
CPC ............ *F42B 3/195* (2013.01); *F42B 3/103* (2013.01); *F42B 3/198* (2013.01); *B21D 28/02* (2013.01);
(Continued)

(58) Field of Classification Search
CPC .......... F42B 3/103; F42B 3/107; F42B 3/195; F42B 3/198; F42B 3/11; F42C 19/12
(Continued)

(56) References Cited

U.S. PATENT DOCUMENTS 1,813,906 A    7/1931    Caron
1,979,894 A    11/1934   Lyons
(Continued)

FOREIGN PATENT DOCUMENTS

CN    1643334 A  *  7/2005  ............. F42B 3/103
CN    2808662 Y     8/2006
(Continued)

OTHER PUBLICATIONS

Milad et al., "The effect of cold work on structure and properties of AISI 304 steel", Journal of Materials Processing Technology, vol. 203 (2008) pp. 80-85 (Year: 2008).*
(Continued)

*Primary Examiner* — James S Bergin
(74) *Attorney, Agent, or Firm* — Taylor IP, P.C.

(57) ABSTRACT

A base body for a metal-sealing material-feedthrough subject to high pressures in an igniter for an airbag or a belt tensioning device. The base body for the metal-sealing material feedthrough is an element formed by a process of cold forming and having a ring-shape or a plate-like shape. The element includes a feedthrough opening extending from a front side of the element towards a rear side of the element. There is a metallurgic section in the element of the base body with structure-lines or flow-lines that are bent due to a reshaping process of the process of cold-forming.

9 Claims, 9 Drawing Sheets

Related U.S. Application Data continuation of application No. 13/234,829, filed on Sep. 16, 2011, now Pat. No. 8,978,557.

(51) Int. Cl.
*F42B 3/198* (2006.01)
*F42C 19/12* (2006.01)
*B21D 28/02* (2006.01)
*H01B 17/30* (2006.01)
*H02G 3/00* (2006.01)

(52) U.S. Cl.
CPC .............. *F42C 19/12* (2013.01); *H01B 17/30* (2013.01); *H02G 3/26* (2013.01); *Y10T 29/49908* (2015.01)

(58) Field of Classification Search
USPC .......... 102/202.5, 202.7, 202, 202.9, 202.11, 102/202.14
See application file for complete search history.

(56) References Cited

U.S. PATENT DOCUMENTS

| | | | |
|---|---|---|---|
| 2,748,464 A * | 6/1956 | Kaul .................. | B21K 21/06 |
| | | | 72/256 |
| 3,155,553 A | 11/1964 | Taylor et al. | |
| 3,274,937 A | 9/1966 | Kyle | |
| 5,206,974 A | 5/1993 | Lautenschläger | |
| 5,243,492 A | 9/1993 | Marquit et al. | |
| 5,345,872 A | 9/1994 | Takahashi et al. | |
| 5,602,359 A | 2/1997 | Hambro et al. | |
| 5,709,724 A | 1/1998 | Naugler et al. | |
| 5,939,660 A | 8/1999 | Fogle, Jr. | |
| 6,196,946 B1 | 3/2001 | Sawai et al. | |
| 6,274,252 B1 | 8/2001 | Naugler et al. | |
| 6,305,286 B1 | 10/2001 | Fogle, Jr. et al. | |
| 6,435,550 B1 | 8/2002 | Werneth et al. | |
| 6,508,175 B1 | 1/2003 | Avetisian | |
| 6,874,422 B2 | 4/2005 | Heeke | |
| 6,877,431 B2 | 4/2005 | Heeke | |
| 7,267,056 B2 | 9/2007 | Takahara et al. | |
| 7,770,520 B2 * | 8/2010 | Fink .................. | F42B 3/103 |
| | | | 102/202.12 |
| 8,127,681 B2 | 3/2012 | Fink | |
| 8,205,554 B2 | 6/2012 | Fink | |
| 8,276,514 B2 | 10/2012 | Fink et al. | |
| 8,327,765 B2 | 12/2012 | Fink et al. | |
| 8,397,638 B2 * | 3/2013 | Fink .................. | F42B 3/107 |
| | | | 102/202.14 |
| 8,978,557 B2 | 3/2015 | Hartl et al. | |
| 9,423,218 B2 | 8/2016 | Hartl et al. | |
| 9,651,345 B2 * | 5/2017 | Hartl .................. | B21K 21/08 |
| 9,885,548 B2 * | 2/2018 | Hartl .................. | F42B 3/103 |
| 10,684,102 B2 * | 6/2020 | Hartl .................. | B21J 1/025 |
| 2002/0024092 A1 | 2/2002 | Palm et al. | |
| 2003/0087705 A1 | 5/2003 | Matsuyama | |
| 2004/0216631 A1 | 11/2004 | Fink et al. | |
| 2005/0126415 A1 | 6/2005 | Takahara et al. | |
| 2006/0207469 A1 | 9/2006 | Fink et al. | |
| 2006/0222881 A1 | 10/2006 | Fink et al. | |
| 2007/0187934 A1 | 8/2007 | Fink | |
| 2008/0250963 A1 | 10/2008 | Fink et al. | |
| 2009/0282952 A1 | 11/2009 | Yen | |
| 2010/0199872 A1 | 8/2010 | Fink et al. | |
| 2015/0176952 A1 | 6/2015 | Hartl et al. | |
| 2015/0362298 A1 | 12/2015 | Hartl et al. | |

FOREIGN PATENT DOCUMENTS

| | | | | |
|---|---|---|---|---|
| CN | 101417379 A | | 4/2009 | |
| DE | 29 16 037 A1 | | 11/1980 | |
| DE | 2916037 A1 * | | 11/1980 | .............. B21J 5/10 |
| DE | 2916037 A1 | | 11/1980 | |
| DE | 10039447 A1 | | 5/2001 | |
| DE | 203 14 580 U1 | | 9/2004 | |
| DE | 102006056077 A1 | | 5/2008 | |
| EP | 1455160 A1 | | 9/2004 | |
| EP | 1491848 A1 | | 12/2004 | |
| EP | 2 151 289 A1 | | 2/2010 | |
| EP | 2151289 A1 * | | 2/2010 | .............. B21K 1/68 |
| GB | 2 030 483 A | | 4/1980 | |
| JP | 2006-29629 A | | 2/2006 | |
| JP | 2008-93622 A | | 4/2008 | |
| JP | 2010-1336698 A | | 6/2010 | |
| WO | 9916721 A1 | | 4/1999 | |

OTHER PUBLICATIONS

Geng et al., "Effects of copper content on the machinability and corrision resistance of martensitic stainless steel", Journal of Material Science (2008) 43:83-87 (Year: 2008).*
Chinese Search Report dated Mar. 24, 2015 for Chinese Patent Application No. 201110285227.1 (4 pages).
Datasheet "Stainless Austenitic Chromium-Nickel Steel with Copper Addition", Deutsche Edelstahlwerke (2 pages).
Extract from the book "Upsetting and Pressing" of Heinz-Dietrich Feldmann and Joseph Billigmann, Hanser Verlag, 2nd Edition (12 pages).
Extract from the book "Extruding—Economical Production of Metallic Precision Workpieces" by K. Lange, M. Kammerer, K. and J. Pöhlandt Schöck, Springer Verlag (12 pages).
European Search Report dated Jan. 27, 2017 for European Patent Application No. 11 00 6788 (6 pages).
"Feinschneiden—Handbuch für die Praxis", Haack et al., Jan. 1, 1977, pp. 22-31 (6 pages).
"Edelstahl Flachverbinder Lochplatte Nagelplatte Lochblech Löcher Holzverbindung Schamiere Beschlag Gestanzt Gerade Set Verbinder Flachverbinder" taken from URL:https://www.edelstahl-werk.de/haushalt/scharniere/edelstahl-flachverbinder-lochplatte-nagelplatte-lochblech-loecher-holzverbindung-schamiere-beschlag-gestanzt-gerade-set/a-320741, Jan. 27, 2017 (2 pages).
Billigmann, Joseph and Feldmann, Heinz-Dietrich, "Heading and Pressing", pp. 209, 237-244, Carl Hanser Verlag, Munich, Germany, 2nd Edition, 1973.
Chinese Search Report dated Apr. 25, 2017 for Chinese Application No. 2015106134150 (2 pages).

* cited by examiner

SECTION A-A

Fig. 1d

Fig 2a PRIOR ART
SECTION A-A
STATE OF THE ART

STATE OF THE ART
PRIOR ART
Fig. 2b

SECTION A-A

RING-SHAPED OR PLATE-LIKE ELEMENT AND METHOD FOR PRODUCING SAME

CROSS REFERENCE TO RELATED APPLICATIONS

This is a division of U.S. patent application Ser. No. 14/635,030, entitled "RING-SHAPED OR PLATE-LIKE ELEMENT AND METHOD FOR PRODUCING SAME", filed on Mar. 2, 2015, which is incorporated herein by reference. Patent application Ser. No. 14/635,030 is a continuation of U.S. patent application Ser. No. 13/234,829, entitled "RING-SHAPED OR PLATE-LIKE ELEMENT AND METHOD FOR PRODUCING SAME", filed on Sep. 16, 2011, issued as U.S. Pat. No. 8,978,557.

BACKGROUND OF THE INVENTION

1. Field of the Invention

The present invention relates to a ring-shaped or plate-like element, in particular for a metal-sealing material-feedthrough, in particular for devices which are subjected to high pressures, for example igniters for airbags or belt tensioning devices, as well as a method of utilization of such a metal-sealing material-feedthrough.

2. Description of the Related Art

Metal-sealing material-feedthroughs are already known in various forms from the current state of the art. Metal-sealing material-feedthroughs are to be understood to be vacuum-tight fusions of sealing materials, especially glasses, glass ceramics or synthetics in metals. The metals function hereby as conductors. We refer you in this context to representative documentation U.S. Pat. Nos. 5,345,872 and 3,274,937. Feedthroughs of this type are common in electronics and in electrical engineering. The material used for sealing, especially glass serves hereby as an insulator. Typical metal-sealing material-feedthroughs are constructed such that metallic internal conductors are sealed into a pre-formed sintered glass component, whereby the sintered glass component or the glass tube is sealed into an outer metal component with the so-called base body which is formed by a ring-shaped or plate like element. Preferred applications for metal-sealing material-feedthroughs of this type are, for example, ignition devices. One area of application is in air bags or belt tensioning devices in motor vehicles. In this case the metal-sealing material-feedthroughs are a component part of an ignition device. The entire ignition device includes in addition to the metal-sealing material-feedthrough an ignition bridge, the explosive agent as well as a metal shrouding which tightly encloses the ignition mechanism. Either one or two, or more than two metallic pins may be inserted through the feedthrough. In a preferred embodiment with one metallic pin the housing is grounded, in a preferred two-pin embodiment one of the pins is grounded.

Metal-sealing material-feedthroughs, especially for igniters for airbags or belt tensioning devices which distinguish themselves in that the feedthrough opening for the metal pins is punched out of the base body have become known from US 2006/0222881 A1, US 2004/0216631, EP-A-1 455 160, US 2007/0187934 A1 and U.S. Pat. No. 1,813,906. During the production of the base bodies from a strip stock having a thickness in the range of between 1 mm and 5 mm, preferably 1.5 mm and 3.5 mm, especially between 1.8 mm to 3.0 mm, more especially preferably between 2.0 mm to 2.6 mm the openings are punched through the entire thickness of base body D by means of a punching process, according to US 2007/0187934 A1. The metal pin in the sealing material is embedded into the opening punched into the base body across the entire thickness of the base body which is in the aforementioned range. Moreover, the feedthrough opening in feedthroughs with more than one pin is arranged off-center according to US 2007/0187934 A1.

According to US 2007/0187934 A1 punching sheet metal has a multitude of disadvantages. One disadvantage is that when punching a strip stock, for example sheet metal of the base body, a great amount of material waste occurs.

An ignition device for a pyrotechnic protective device has become known from DE 10 2006 056077 A1 which has a casing for positioning the current feedthrough of the metal pin and means to avoid a relative movement between casing and metal pin. As in the case of US 2007/0187934A1 the base body is also punched from a sheet metal, for example a strip stock. Moreover, the feedthrough openings were arranged off-axis, as in US 2007/0187934A1.

EP 1 491 848 A1 shows a current feedthrough with a centrally located feedthrough opening for a pin-type conductor. The production method for the feedthrough opening is not described and it extends over the entire thickness of the base body.

Especially in metal-sealing material-feedthroughs with two metal pins and an off-center opening the problem arises that the off-center opening results in a weakening of the glazing.

What is needed in the art is to avoid the described disadvantages according to the current state of the art and to cite in particular a base body in the form of a ring-shaped or plate-like element for a metal-sealing material-feedthrough which can be produced with lesser material waste than is the case in the current state of the art, in particular also in a cold forming process. Moreover, to produce the base body should be especially simple.

SUMMARY OF THE INVENTION

The present invention provides a plate-like element which forms the base body for a metal-sealing material-feedthrough that includes a feedthrough opening which is located substantially in the center of the plate-like element, whereby the plate-like element has a thickness (D) and whereby a relief region is provided in the region of the feedthrough opening in the plate-like element. The thickness of the plate-like element is reduced in the area of the feedthrough opening by the relief region, for example so that the feedthrough opening can be punched out through the ring-shaped or plate-like element in the area of the relief region. Punching out the opening provides a base body which is especially easy to produce.

If the thickness of the entire ring-shaped or plate-like element is, for example, 4 millimeters (mm), then a reduced thickness DR can be provided in the area of the feedthrough opening with the assistance of a relief region which may, for example, be punched out of a cold-formed material by means of a punch. If the height HF of the relief region is for example 1.5 mm then, at a thickness DR of 4 mm a reduced thickness DR of 2.5 mm results in the region of the ring-shaped or plate-like element in which the feedthrough opening is to be produced. The reduced thickness DR of 2.5 mm permits even with a hard or respectively rigid material—as used in the case of cold forming the base body—punching out of the feedthrough opening in the region of the reduced thickness.

According to the present invention, the thickness (D) of the ring-shaped or plate-like element may be reduced by the relief region by between 20% and 60%, for example between 30% and 50%.

In order to make the ring-shaped or plate-like element compatible with the currently used turned components it is provided that thickness D of the ring-shaped or plate-like element is in the region of 3.5 to 6 mm. In order to ensure punchability in the region of the feedthrough opening the reduced thickness is, for example, in the range of 1.5 mm to 4.5 mm, or between 2.0 mm to 3.0 mm. Due to the compatibility it is possible that components produced by means of forming, in particular cold forming, and punching according to the present invention can be used in airbag igniters as replacements for components produced by turning without having to substantially change the production method.

The ring-shaped or plate-like element may consist of steel, for example high grade steel with a copper content in the range of 1 weight % to 5 weight %, for example between 2 weight % to 4 weight %. A material of this type allows for the plate-like element, or respectively the base body, to be produced through reshaping, especially through cold forming, for example from a wire material. Hereby a piece is initially cut off a steel wire with the above stated copper content and is then brought into the desired shape by means of forming, for example compression. This is only possible if the material possesses a certain elasticity which is achieved through the stated copper content. The material is heavily compressed or respectively compacted through the described reshaping, in particular cold forming process. The material of the plate-like body does not only have to be workable through forming, in particular cold forming, but must also guarantee reliability in laser welding.

Surprisingly it has been found that a steel, in particular a high grade steel with a copper content of 1 weight % to 5 weight %, combines these two conflicting characteristics, namely on the one hand the sufficient elasticity for reshaping, in particular cold-forming, and on the other hand sufficient rigidity, or respectively flexural strength in order to withstand the high extraction forces or respectively the high ejection force under load, as can occur in a metal-sealing material-feedthrough in an igniter.

The formed, in particularly cold formed, ring-shaped or plate-like element has a substantially round or circular outer shape due to the round or circular outer contour of the substantially cylindrical wire. In order to achieve the previously described values of ejection force for the metal pin in the metal-sealing material-feedthrough, the feedthrough opening is arranged so that they include means to avoid a relative movement of sealing material and base body. This is achieved for example in that protrusions are provided in the feedthrough opening or in that it, for example, has a substantially conical progression.

The previously described ejection force which is characteristic for metal-sealing material-feedthroughs is that force which must be applied in order to eject the sealing material which is placed in the opening of the metal-sealing material-feedthrough from the feedthrough. The level of the ejection force may be determined either hydrostatically or mechanically. If the ejection force is determined mechanically then the surface of the sealing material is acted upon by a punch whereby the surface of the punch which presses upon the sealing material is smaller than the surface of the sealing material.

Alternatively, the ejection force may be measured hydrostatically. In the case of a hydrostatic measurement the sealing material is acted upon by a hydrostatic pressure, for example water pressure and is then measured, whereby the sealing material is expelled from the feedthrough opening by the application of hydrostatic pressure.

In addition to the inventive ring-shaped or plate-like element, the present invention also provides a metal-sealing material-feedthrough with a ring-shaped or plate-like element being the base body, whereby the metal pin of the metal-sealing material-feedthrough is glazed into the feedthrough opening of the ring-shaped or plate-like element with the assistance of a sealing material.

For this purpose the metal pin is first fused into the sealing material which may, for example, be a glass plug. Then, the glass plug is placed together with the metal pin into the feedthrough opening. The glass and metal ring, in this case the ring-shaped or plate-like element are heated, so that after cooling the metal shrinks onto the sealing material—in this case the glass plug.

The metal pin may include means to avoid relative movements. These can especially advantageously include local expansions and/or constrictions of the metal pin diameter in the region of the glazing. In the simplest scenario this is achieved by ripples in the metal pin which can, for example, be produced by rolling the metal pin over suitable embossing tools. Other suitable forms and production methods are obviously also covered by the invention.

A metal-sealing material-feedthrough is, for example, cited whereby two metal pins are provided. Since, according to the present invention, the feedthrough opening in the plate-like element is located essentially in the center, both metal pins are curved. While one of the metal pins is passed through the feedthrough opening insulated in the glass plug, the other metal pin is, for example, in the embodiment of a grounded pin and is conductively connected with the base body.

The inventive metal-sealing material-feedthrough is advantageously utilized in ignition devices of any desired design. For example, an ignition device of this type can be provided for a pyrotechnic protective device, especially for an airbag or a belt tensioning device. A pyrotechnic protective device of this type includes a metal-sealing material-feedthrough in accordance with the current invention, as well as a cap connected with the base body of the metal-sealing material-feedthrough, whereby a propellant is encased between the metal-sealing material-feedthrough and the cap. The ignition device with the inventive metal-sealing material-feedthrough can be utilized in gas generators, for example in hot gas generators, cold gas generators and hybrid generators. As stated above, preferred areas of application are devices for pyrotechnic protective systems, for example airbags and belt tensioners. A plate-like body, for a metal-sealing material-feedthrough is produced, for example, from a glass plug by reshaping.

Other applications of the inventive ring-shaped or plate-like element are also covered by the invention. An additional application of the present invention is, for example, use of a pressure sensor as a feedthrough element.

In a method to produce a metal-sealing material-feedthrough by reshaping, a blank, for example of a wire-shaped material, is provided and the blank is subjected to processing so that a feedthrough-opening can be incorporated into a ring-shaped or plate-like element created from the blank, such as through punching. The processing of the blank or respectively providing the blank with a shape may occur through only forming, for example, cold-forming. The process steps of the method can be carried out in varying sequence.

One possible sequence without limitation thereto includes the following process steps:

A blank in the form of a wire-shaped material is provided.

The blank is formed, by means of compressing, for example cold-formed, whereby the relatively geometric dimensions are changed, resulting in the plate-like element with an essentially round outside contour.

A relief region is incorporated into the plate-like element.

After incorporation of the relief region in the plate-like element—which results in that the plate-like element has a lesser thickness in the region of the through-opening than the thickness of the plate-like element, especially the base body—the through-opening is produced in the region of reduced thickness with the assistance of a punching process.

The relief region may be incorporated into the blank or the ring-shaped or plate-like element, or respectively the base body in that the blank or the ring-shaped or plate-like element is pressed against a punch. Due to the pressure of the punch the material of the blank or the ring-shaped or plate-like element which is, for example steel, such as high grade steel with a copper component of 1 to 5 weight % copper surrounds around the punch. In this manner a relief bore or respectively a relief region can be incorporated into the blank or the ring-shaped or plate-like element by means of the punch. Alternatively it is possible not to press the blank or the ring-shaped or plate-like element against a punch, but instead press a punch against one side of the blank or the ring-shaped or plate-like element. Due to the pressure this results in that the material of the plate-like body is pushed out on the side opposite the side on which the pressure is exerted. The result of this process is again the production of a relief region.

In addition to the relief region as previously described an additional opening can be incorporated on the side opposite the relief region, for example a conical opening by means of forming or respectively reshaping, in particular cold-forming.

After providing the relief region, or respectively the relief region and/or the additional opening, a punching tool is applied in the area of the relief region or respectively the additional opening and the feedthrough opening is produced by means of punching. The thickness of the ring-shaped or plate-like element is reduced in the region of the through-opening which is to be punched, for example to values from 1.5 mm to 4.5 mm.

A conically tapering opening may, for example, be produced without cutting with the assistance of the reshaping process and the punching tool.

The advantage of the illustrated method is that the production of the ring-shaped or plate-like element which finds use in a metal-sealing material-feedthrough occurs essentially at the same time interval in all different process steps. This means that the step of forming, in particular cold-forming, the step of incorporating the relief opening or respectively the relief region or respectively the additional opening, as well as the step of punching the through-opening into the ring-shaped or plate-like element requires essentially the same amount of time. In this manner it is possible—starting with a wire like material—to produce a ring-shaped or plate-like element with a through-opening essentially at the same pace at different work stations, that is the work station for cold forming, the work station for producing the relief opening and the work station for punching. If it is necessary, like for example in the current state of the art, to produce the bore in a machined or cold formed ring-shaped or plate-like element not by means of a punching process but by means of a drilling process, then the drilling process requires a much longer time than reshaping, due to which the production of a ring-shaped or plate-like element requires at least double the time, compared to the described reshaping method.

An additional advantage of the inventive ring-shaped or plate-like element is that with the described production method no, or at most very little, material waste occurs. Therefore, it can be produced very efficiently.

As stated previously, the plate-like element may consist of steel, such as high grade steel with a copper content in the range of 1 weight % to 5 weight %, for example between 2.0 weight % to 4 weight %. A material of this type allows for the ring-shaped or plate-like element, or respectively the base body to be produced through reshaping, for example from a wire material. Hereby a piece is initially cut off a steel wire with the above stated copper content. In an additional step it is brought into the desired shape by means of reshaping or respectively through compression into the form of the plate-like element. This is only possible if the material possesses a certain elasticity which is achieved through the stated copper content. The material is heavily compressed or respectively compacted through the described reshaping.

However, the material does not have to be formable only through forming, in particular cold forming, but in applications, for example for airbag igniters, it must also enable secure retention of the sealing material in the feedthrough opening. A measure for this, particularly when used in an igniter, are the ejection forces which act mechanically upon the sealing material. There are a multitude of industrial standards for the level of the ejection forces. They range, for example, from 1350 bar or 1360 bar to above 1500 bar, above 1600 bar and 1750 bar to 2000 bar or 2500 bar or even 3000 bar. The cited values are pressure data corresponding to the ejection forces and are measured hydrostatically through the previously described method. When utilized as igniters they correlate with the relevant expulsion pressures.

Moreover the material must also guarantee reliable laser welding which is a conventional method in order to attach the ignition cap.

It has been shown that the relief region not only enables the punchability of the feedthrough opening. The reduction in thickness of the ring-shaped or plate-like element in the relief region can also facilitate a local deflection of the element during pressurization, for example through the explosion pressure. The inventors recognized that this deflection does not have to be negative, but that instead the extraction resistance of the sealing material in the feedthrough opening can even be increased, especially if the feedthrough opening possesses the described means to prevent the relative movement.

This can be explained as follows: If the relief region and therefore the relief opening is located on the side of the element facing away from the pressure (i.e. on the underside), the pressure which for example occurs on ignition of the igniter, but also during measuring of the extraction forces, acts on the entire top side of the element. Among other factors the deflection of the element is dependent on the rigidity and the thickness of the material. In the area outside the relief region the material in an inventive element is compacted and thick, so that in fact no deflection can occur. In the area of the reduced thickness in the relief region a local deflection may however occur which leads to a compression of the material on the top side and to stretching on its underside. This results in that the feedthrough opening tends to indent in the upper region (that is the side facing the pressure) and to expand on the underside. If the sealing material (and preferably the metal pin in it) is in the feedthrough opening, a lateral pressure is exerted vertical to the surface of the feedthrough opening and thereby the glazed region of the sealing material, and at the same time upon the glazed in metal pin. This local compression pressure can lead to a noteworthy increase in the ejection forces of the sealing material from the feedthrough opening. This increase can be further increased in that the feedthrough opening has a larger diameter in the upper region (of the indentation) than in the lower region (of the expansion). The different diameters represent the means to avoid the relative movement and are realized through a step or a conical progression of the feedthrough opening.

Moreover, the reduction of the thickness of the ring-shaped or plate-like element in the relief region can improve the weldability of the element with additional elements, for example with the cover cap of igniters or pressure sensors. The reduction in thickness of the element in the relief region causes the element to have a peripheral ring-shaped area which is thicker compared to the relief region. When producing, for example, an ignition device or a pressure sensor a metal pin is normally glazed into the feedthrough opening on the ring-shaped or plate-like element. Likewise, a second conductor can be connected to the bottom of the element. A cover cap is normally welded to the outer circumference of the element. When welding on the cover cap, heat is inevitably introduced into the element. Care must be taken here that the glass as the sealing material is not damaged. The peripheral area which is qualified by the relief region has a larger surface which can again radiate the introduced heat, thereby reducing the temperature load on the sealing material. This ring-shaped area therefore functions as a welding edge during the welding process. Due to the simplified weldability, rejects in further processing of the element into the end product can be reduced and the process stability increased.

In addition to the described method for the production of the ring-shaped or plate-like element the ring-shaped or plate-like element can initially be produced as described above in a method to produce a metal-sealing material-feedthrough with a ring-shaped or plate like element as base body. Subsequently, a metal pin is fused into a sealing material which may, for example, be a glass plug. Then, the glass plug is placed together with the metal pin into the feedthrough opening. The glass and the metal ring, in this case the ring-shaped or plate-like element are heated, so that after cooling the metal shrinks onto the sealing material—in this case the glass plug.

A method for the production of a metal-sealing material-feedthrough is further provided according to the present invention wherein two metal pins are provided. Since, according to the present invention, the feedthrough opening in the plate-like element is located essentially in the center, both metal pins are curved. While one of the metal pins is passed through the feedthrough opening insulated in the glass plug, the other metal pin is, for example, in the embodiment of a grounded pin and is conductively connected with the base body, for example through brazing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
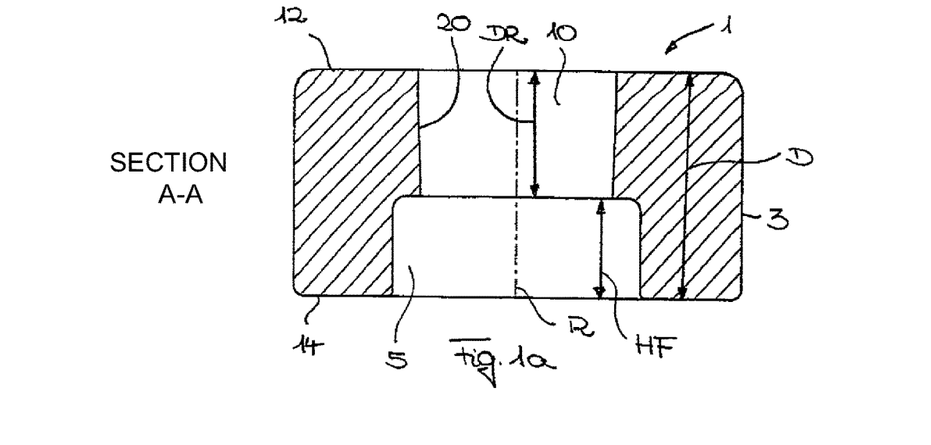
FIGS. 1a-1d illustrate a ring-shaped or plate-like element according to the present invention.
Figure 1B:
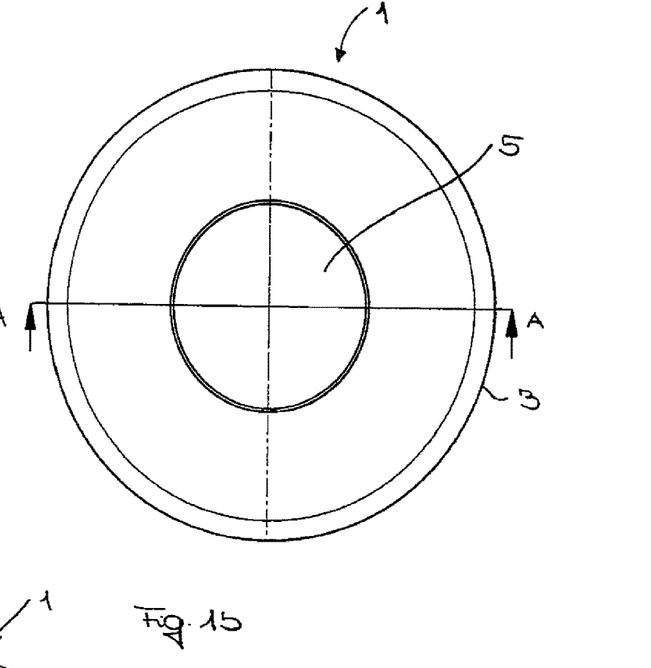
Figure 1C:
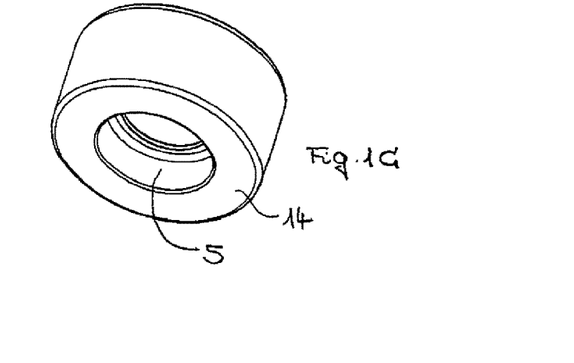

Referring now to the drawings, and more particularly to FIGS. 1a-1c, there is shown a ring-shaped or plate-like formation or element according to the present invention which essentially is utilized as the base body for a metal-sealing material-feedthrough. As shown in the top view in FIG. 1b, ring-shaped or plate-like element 1 has essentially circular outer contour 3. Ring-shaped or plate-like body 1 is produced, for example, by a reshaping process, such as a cold-forming process, for example from a wire. Hereby, a piece is first cut from the wire and is subsequently transformed through a reshaping process, for example through compression into the spherical or circular form illustrated in FIG. 1b in a top view and FIG. 1c three-dimensionally from backside 14.

Following this, relief region 5 is provided into reshaped component 1 by means of a punch. When providing the relief region with a punch the reshaped material surrounds the punch.

The sequence of the process steps is only exemplary. Alternatively the relief region could first be incorporated and the ring-shaped element thus provided with the relief region through reshaping, such as cold-forming to transform it into the required shape.

The height or respectively thickness of the relief region which is also essentially circular as shown in the top view from the rear in FIG. 1b equals HF.

Figure 1D:
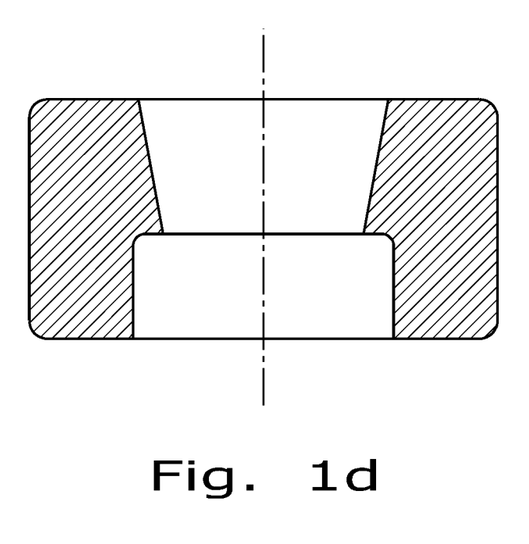

The thickness of the entire ring-shaped element which is obtained through reshaping equals D. The material therefore is weakened in the areas where the feedthrough opening is essentially placed central relative to rotational axis R of the ring-shaped body, so that the solid material through which feedthrough opening 10 in ring-shaped element 1 must be punched equals merely DR. Thickness D of the ring-shaped body is, for example, reduced by between approximately 20% and 60%, or between approximately 30% and 50% through incorporation of the relief region. If one single relief region with a height or respectively thickness HF is provided, then the height or respectively thickness HF is between approximately 20% and 60%, or between approximately 30% and 50% of thickness D of the ring-shaped or respectively plate-like body. Thickness D of the ring-shaped or plate-like element may vary between 3.5 mm to 6 mm and thickness DR of the region to be punched out between 1.5 mm and 4.5 mm. If ring-shaped element 1 is utilized in a metal-sealing material-feedthrough, then a metal pin in a sealing material, for example in a glass plug is inserted in feedthrough opening 10. The glass plug is then in contact with the walls of the feedthrough opening. In order to avoid pushing the metal pin which was glazed into a glass plug out of feedthrough opening 10, even at high pressures means are provided to prevent a relative movement from front side 12 of plate-like element 1 to rear side 14. In the present embodiment of the present invention this is achieved in that the feedthrough opening tapers conically over at least one region 20, as illustrated in FIG. 1d.

Figure 2A:
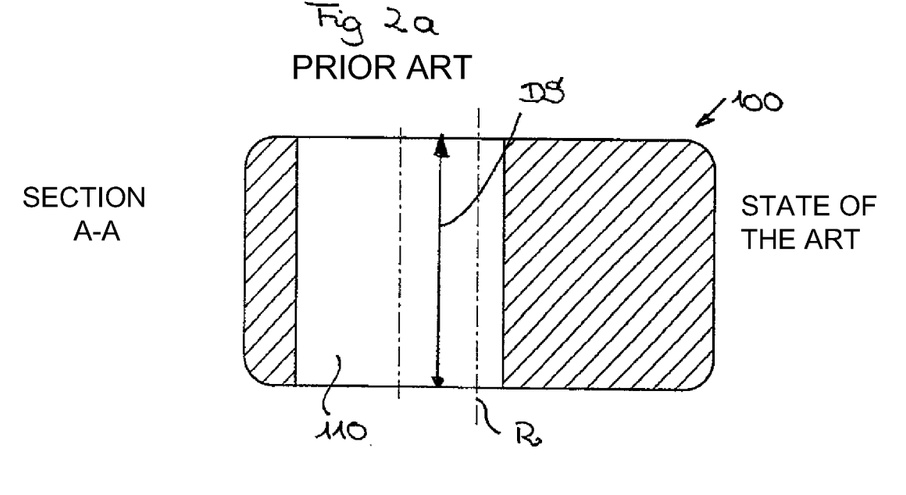
FIGS. 2a-2c illustrate a ring-shaped or plate-like element according to the current state of the art.
Figures 2B, 2C:
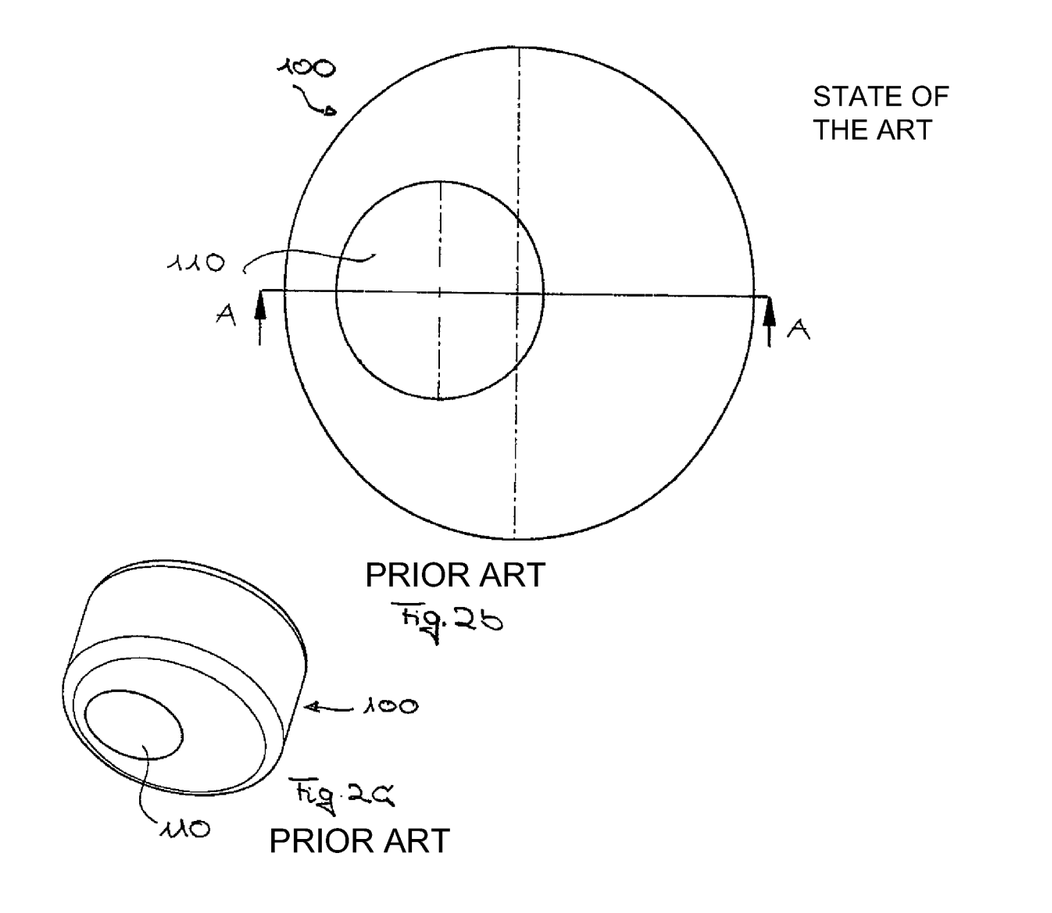

In comparison to FIGS. 1a-1c, FIGS. 2a-2c show a ring-shaped or plate-like element according to the current state of the art. Ring-shaped or plate-like element 100 according to the current state of the art is machined or is obtained in the form of a reshaped component, for example from a cut off wire segment. Feedthrough opening 110 is incorporated in component 100 for glazing of the metal pin. In contrast to FIG. 1a, feedthrough opening 110 incorporated into the ring-shaped or plate-like body produced for a metal-sealing material feedthrough base body is placed off-center, in other words offset relative to rotational axis R. Due to the off-center arrangement and very great thickness DS through which the feedthrough opening must be punched it is not possible to punch the feedthrough opening from cold-formed ring-shaped or plate-like element 100. Feedthrough opening 110 is rather incorporated into the base body having thickness DS of for example 4.5 mm by drilling. Compared to a punching procedure this is a substantially more expensive procedure, in particular, a bore of this type requires a much longer time than the production of the ring-shaped or plate-like component or respectively element with the assistance of reshaping. Drilling out is necessary in particular because the material is heavily compressed through the reshaping process, so that simple punching out is not possible. A top view of plate-like element 100 according to the current state of the art is shown in FIG. 2b, and a three-dimensional view in FIG. 2c. Feedthrough opening 110, located off-center is clearly recognizable.

Figure 3A:
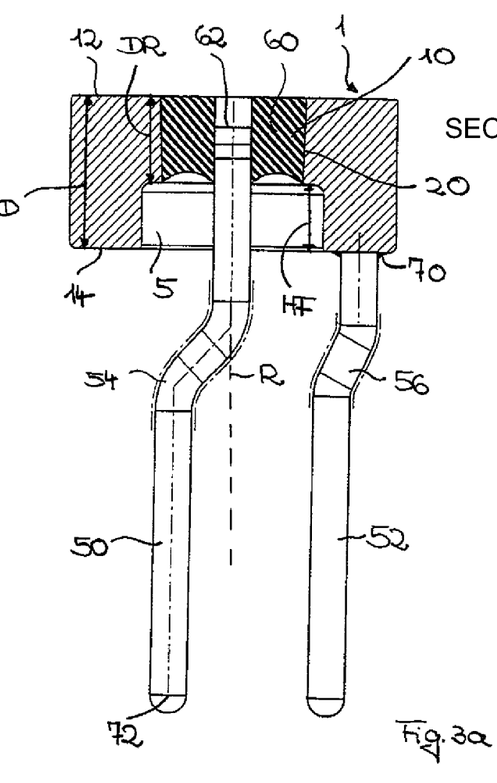
FIGS. 3a-3c illustrate a metal-sealing material-feedthrough according to the present invention.
Figure 3B:
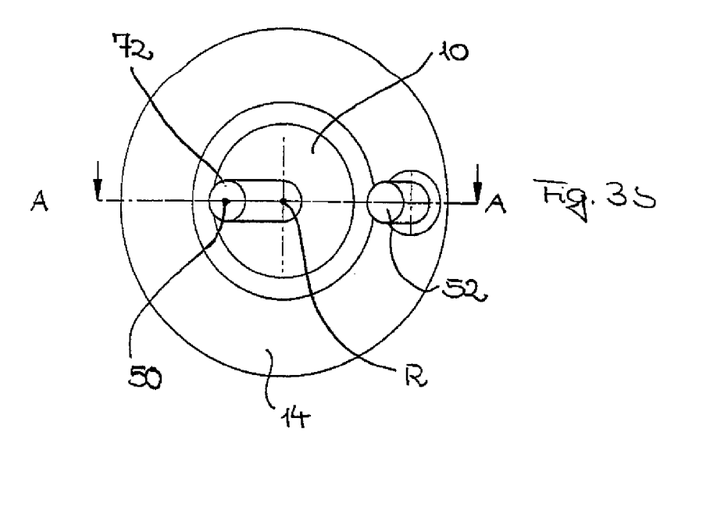
Figure 3C:
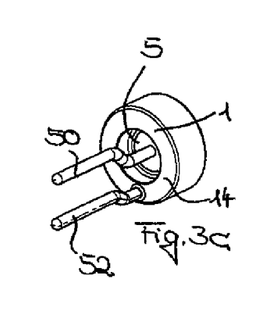

Referring now to FIGS. 3a-3c, there is illustrated utilization of a plate-like element according to FIGS. 1a-1c according to the present invention in a metal-sealing material-feedthrough, for example for airbag ignition devices or belt tensioning devices. Hereby FIG. 3a illustrates a section according to FIG. 1a, FIG. 3b a top view according to FIG. 1b and FIG. 3c an exploded view according to FIG. 1c from rear 14. Identical components as shown in FIGS. 1a and 1c carry the same identification numbers.

Ring-shaped element 1 is clearly recognizable. Moreover, relief region 5 is recognizable, which for example is punched out of the cold-formed ring-shaped or plate-like element 1 by means of a punch. Above the punch, feedthrough opening 10 with conical progression 20 which is punched from the remaining material with thickness DR can be seen. Whereas in the embodiment of the present invention illustrated according to FIGS. 3a-3c the conical form is incorporated over the entire length of the feedthrough opening, it is possible that in an alternative embodiment the conical form extends only over a section of the length of the feedthrough opening which means that the feedthrough opening possesses two segments—one conical and one adjacent thereto which is not conical. The conical segment may be produced, for example, through reshaping or respectively forming and the non-conical segment through punching.

Alternately it is also possible to produce the relief region by means of a separate machining process, for example through drilling and/or milling. It is equally possible to combine the processes, for example in that the relief region is first pre-formed during reshaping in the previously described processes and is then transformed into its finished form through separate machining methods, such as milling and/or drilling. The term "relief region" in the sense of the current invention is therefore used regardless of the type and method in which it was produced. It includes in particular the production through reshaping and the production through machining processes such as milling and/or drilling. Therefore it can also be used synonymously with relief bore.

The ring-shaped or plate-like element serves as the basis for a metal-sealing material-feedthrough with a total of two metal pins 50, 52. While metal pin 50 is fed through the ring-shaped or plate-like base body 1 from the front side to the rear side, insulated in sealing material 60—in this case a glass material which however can also be glass ceramics or ceramic materials—second metal pin 52 serves as ground pin. For this purpose, second metal pin 52 is connected directly with ring-shaped or plate-like body 1. Metal pin 50 as well as metal pin 52 is curved. The curvature of both metal pins is identified with 54 and 56 respectively and is clearly recognizable.

Metal pin 50 is moreover provided with means 62 on metal pin 50 directly, which engage into the glass plug, thereby preventing the metal pin being pushed out of glass plug 60 into which the metal pin is glazed—even at high pressures.

Glazing of metal pin 50 into sealing material 10 occurs through melting. As soon as the metal pin is fused into the sealing material the glass plug is inserted into feedthrough opening 10 together with the metal pin. Then, the glass plug, together with the ring-shaped or plate-like element, that is the base body, is heated so that after cooling the metal of the ring-shaped or plate-like element shrinks onto the sealing material, in this case the glass material, as previously in the production of the glass plug whereby the metal pin is inserted into the glass plug. Grounded metal pin 52 is connected conductively with the plate-like element, for example through brazing. The welding location is identified with 70.

Figures 4A, 4C:
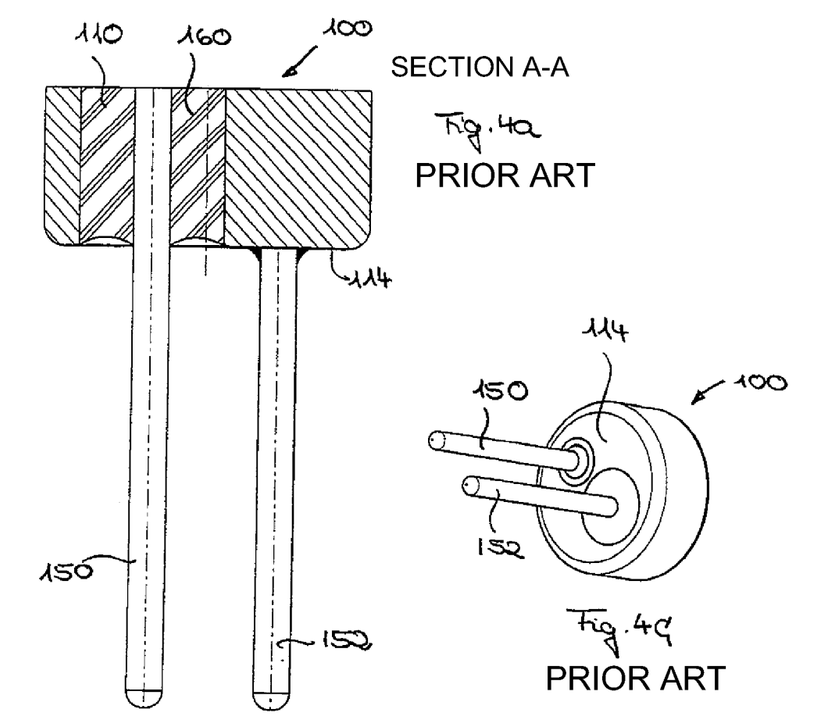
FIGS. 4a-4c illustrate a metal-sealing material-feedthrough according to the current state of the art.
Figure 4B:
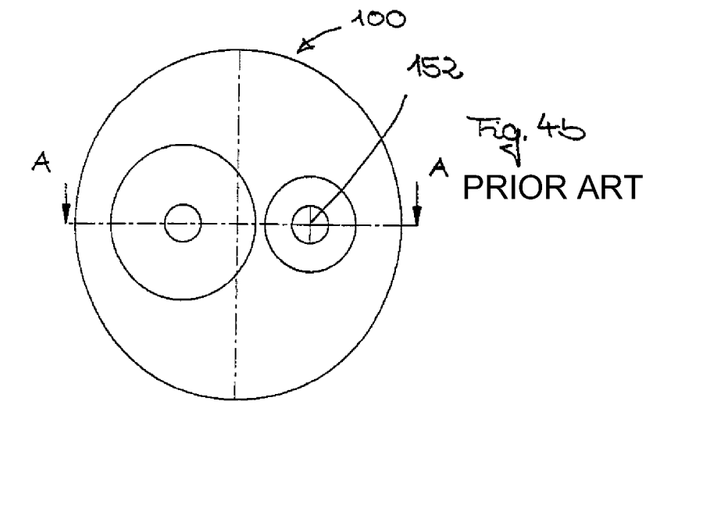

Referring now to FIG. 3b there is shown a top view from rear side 14 of an inventive metal-sealing material-feedthrough. Clearly seen in the top view is central feedthrough 10 in ring-shaped or plate-like element 1. Moreover, curved metal pin 50 and 52 respectively are clearly recognizable. Especially on metal pin 50 it can be clearly seen that the metal pin is offset, that is bent at end 72 relative to center R of the plate-like base body. This also applies to metal pin 52. The curved pins are also clearly visible in the view in FIG. 3c. The illustration in FIG. 3c of the entire metal-sealing material-feedthrough shows in particular also welding region 70 of the grounded pin as well as relief region 5 in the ring-shaped or plate-like base body. It is characteristic for a metal-sealing material-feedthrough with a ring-shaped or plate-like element as a base body according to the present invention which has relief region 5 that glazing 20 of the metal pin in the base body occurs only over a partial region, namely only over thickness DR of the feedthrough opening and not over entire thickness D of the base body. In contrast hereto, glazing in a metal-sealing material-feedthrough according to the current state of the art occurs, as shown in FIGS. 4a-4c, over entire thickness DS of the ring-shaped or plate-like formed base body, as illustrated in FIGS. 2a-2c. Glazing 160 is again implemented with metal pin 150 in feedthrough opening 110 of the ring-shaped or plate-like element. Whereas metal pin 150 is inserted into glazing 160, grounded pin 152 is welded onto ring-shaped or plate-like base body 100. Both pins—metal pin 150 and grounded pin 152 are straight.

Referring now to FIG. 4b, there is shown a top view of a metal-sealing material-feedthrough according to FIG. 4a. Identical components as in FIG. 4a carry the same reference numbers. As can be clearly seen, metal pins 150, 152 do not have a curved structure. FIG. 4c is an exploded view drawing of back side 114 of the component according to FIG. 4a-4b.

Figure 5A:
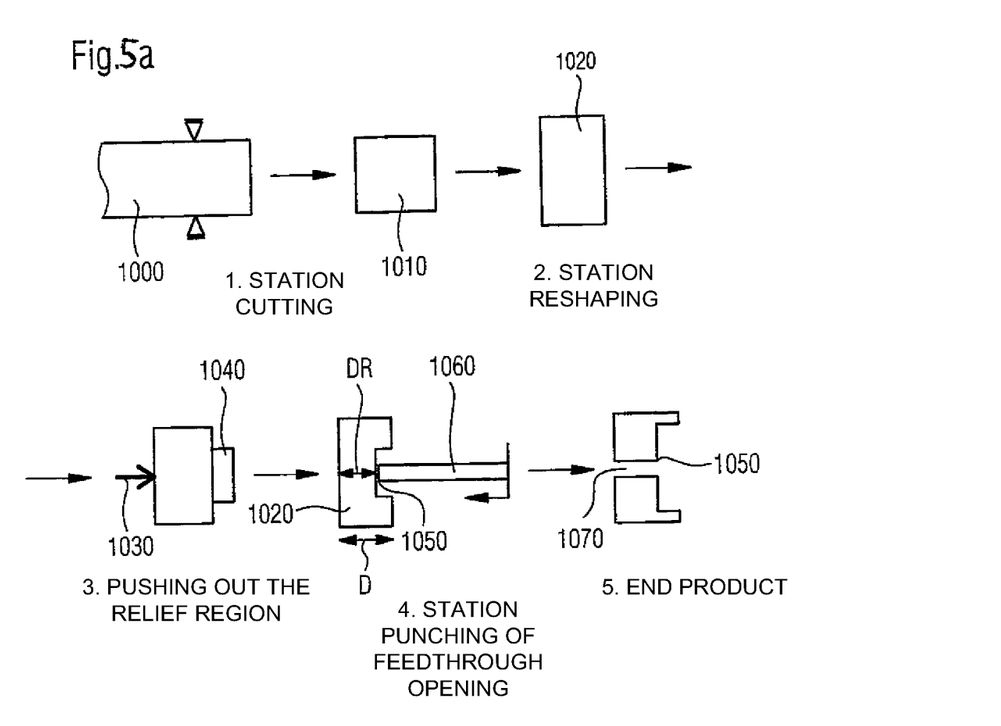
FIGS. 5a-5d illustrate a method to produce a ring-shaped or plate-like element according to the present invention.

Referring now to FIG. 5a, there is shown the various stations of an embodiment of the production process for a plate-like element according to the present invention. In the first station blank 1010 is separated or respectively cut from wire like material 1000. In the second step, that is in the second station to which the severed blank is transported, in one production step the blank is formed by compressing, for example cold-formed to the point where the outside dimensions conform to the outside dimensions which the ring-shaped or plate-like element that is to be manufactured must have. The relative geometric dimensions are hereby altered, whereby in the current example the blank becomes wider due to compressing. In the following third station reshaped plate-like element 1020 is pressed against punch 1040 with pressure 1030. Due to the pressure with which the ring-shaped or plate-like element is pressed against the punch, the material of the ring-shaped or plate-like element surrounds the punch. The material in the region of the punch is thereby removed from the plate-like element and the plate-like element with relief opening or respectively relief region 1050 shown in the fourth station remains. The description of the sequence of process steps is merely exemplary. A relief opening in the blank could also be produced first, followed by subsequent reshaping. It would also be possible to implement the reshaping step in station 2 and the incorporation of the relief region for example through forming in station 3 in one single station, for example station 2. Station 3 would then be eliminated.

Due to the relief region, thickness D of the plate-like element has been greatly reduced in region 1060 of the ring-shaped or plate-like element—that is to thickness DR. Thickness D of the ring-shaped or plate-like element is hereby reduced by between approximately 20% and 60%, or between approximately 30% and 50%, which means that thickness DR is between 80% and 40%, for example between 70% and 60% of thickness D. Then, in a fifth process step punching tool 1060 is inserted into the relief opening and conical feedthrough opening 1070 is for example punched through the ring-shaped or plate-like element. Essentially, the ring-shaped or plate-like element with relief opening and feedthrough opening results as demonstrated in the fifth station. The inventive method distinguishes itself in that for each of the cited stations, that is for severing the wire-like base material, reshaping, provision of the relief opening or respectively the relief region and punching of the feedthrough opening through the plate-like element with reduced thickness, essentially the same time is taken for each process step. This allows for the inventive method to be highly automated.

Figure 5B:
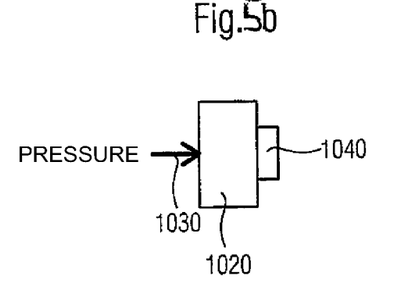
Figure 5C:
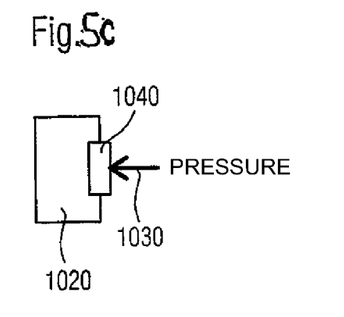

Referring now to FIGS. 5b and 5c there are shown two methods which are possible in principle for incorporation of the relief region and/or of additional openings through forming. In FIG. 5b, as in FIG. 5a ring-shaped or plate-like element 1020 is pressed against punch 1040 in the third step, so that the material surrounds the punch and from this a relief opening and/or an additional opening results. Alternatively it would be possible, as shown in FIG. 5c, that the plate-like base body 1020 is not pressed against punch 1040, but vice versa, punch 1040 is pressed against ring-shaped or plate-like base body 1020. Then, due to the pressure on the side of the ring-shaped or plate-like body opposite the punch, the material is expelled. The result again is the ring-shaped or plate-like element with relief region and/or an additional opening.

Figure 5D:
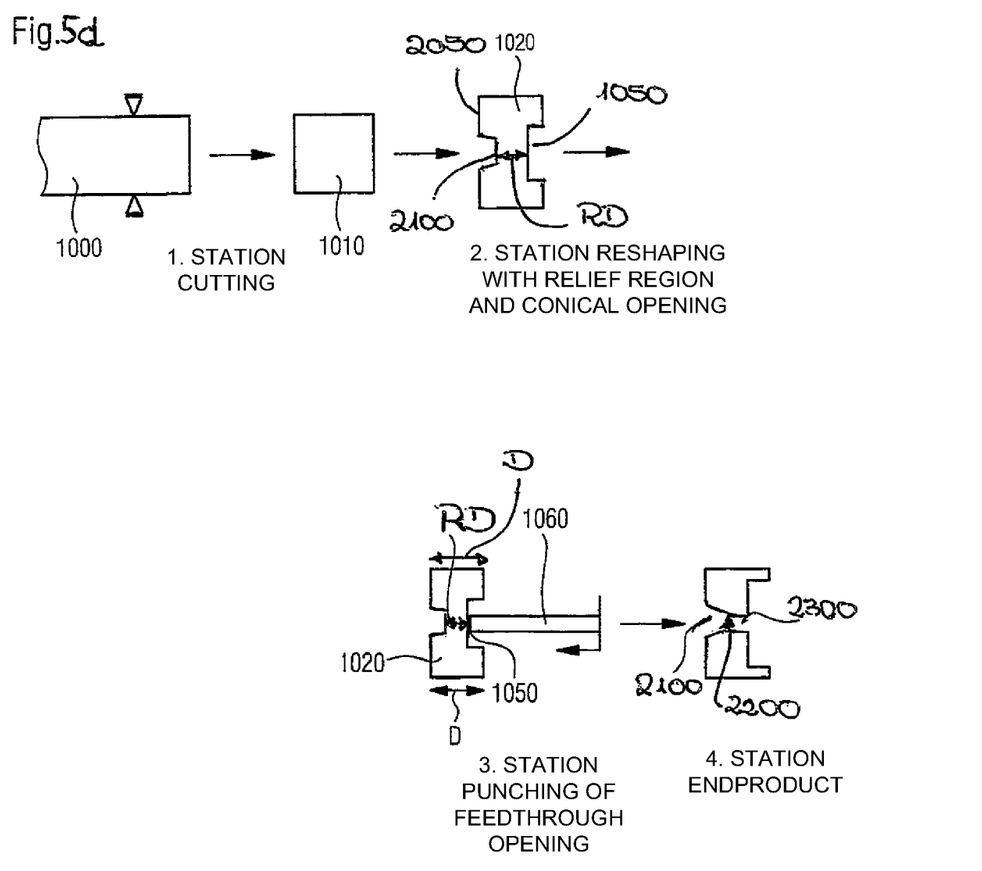

Referring now to FIG. 5d there is shown a method wherein additionally to relief region 1050, additional opening 2100 is incorporated on opposite side 2050 before thereby resulting remaining thickness RD is punched through. For identical components as in FIGS. 5a-5c the same reference numbers are used. The additional opening which can be conical is, for example, provided through forming, for example by means of a punch. It is possible, however not necessary if in the second station during reshaping relief region 1050 and on side 2050 opposite relief region 1050 additional, for example conical, opening 2100 is already provided, for example also through forming. This has the advantage that only one process step is required. By incorporating the additional opening only remaining thickness RD which is located between additional opening 2100 and relief region 1050 has to be punched through in the punching station in order to provide the feedthrough opening into which the metal pin is glazed. As can be clearly seen, feedthrough opening 2200 has two regions—one conical region or respectively conical opening 2100, as well as punched out region 2300. With the alternative method therefore, the conical opening can be produced especially easily, namely through forming, for example in the reshaping step. Obviously, as in the method in step 5a in station 2, the blank could first be compressed and the relief bore and/or additional opening be produced following this step. Remaining thickness RD which is to be punched through amounts here to between 10% and 70% of total thickness D, for example between approximately 30% and 50% of total thickness D of the ring-shaped or plate-like element.

Figure 6A:
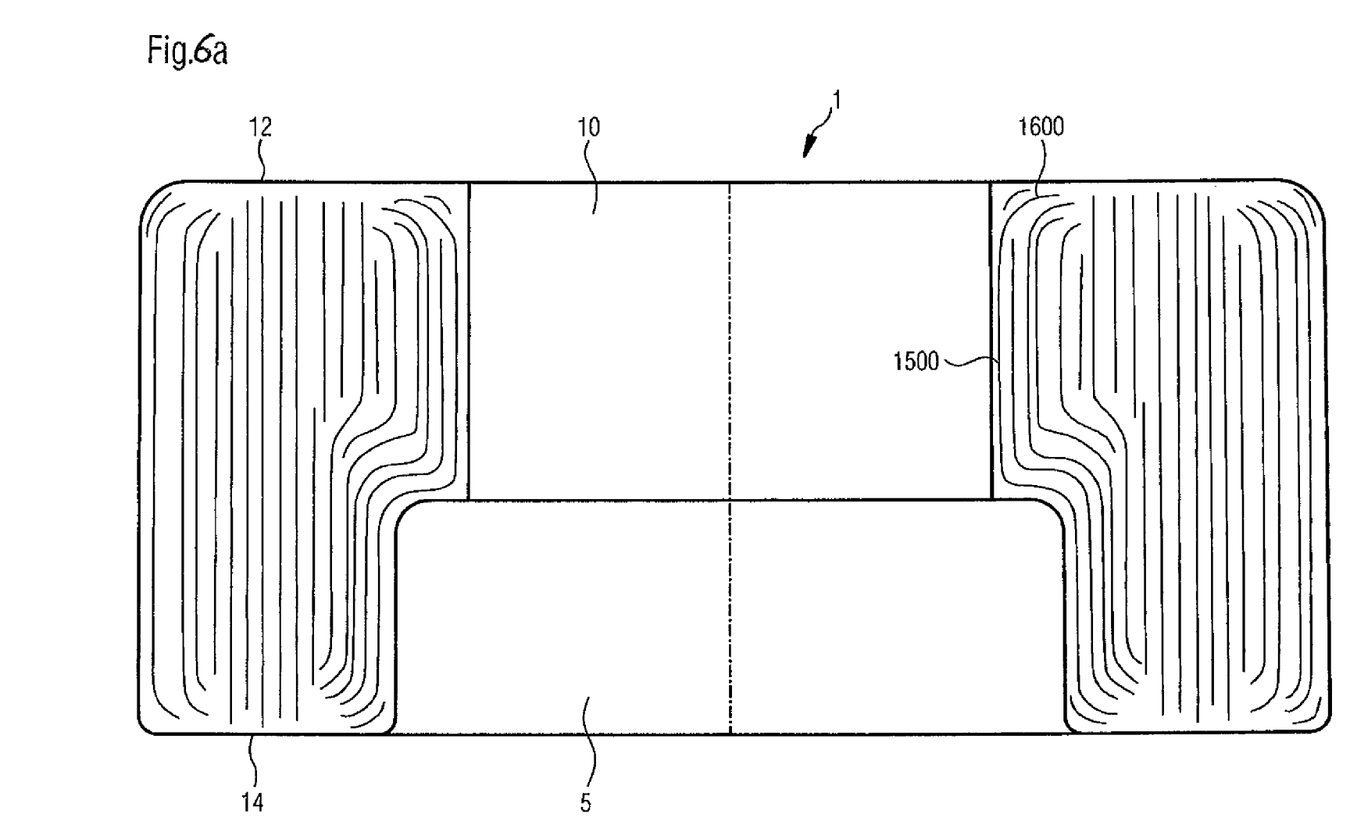
FIGS. 6a-6b illustrates comparison of the phase lines in a metallurgical section of a ring-shaped or a plate-like body produced by reshaping and produced by machining.

Referring to FIG. 6a there is shown a metallurgical section through a ring-shaped or plate-like element 1 produced in a reshaping and punching process, as illustrated in FIG. 1a. Identical components as shown in FIG. 1a carry the same identification numbers. As can be seen from the metallurgic section according to FIG. 6a, ring-shaped or plate-like elements 1 produced according to the inventive method are identified through structure-/flow-lines 1500 which were bent in region 1600 due to the reshaping process.

Figure 6B:
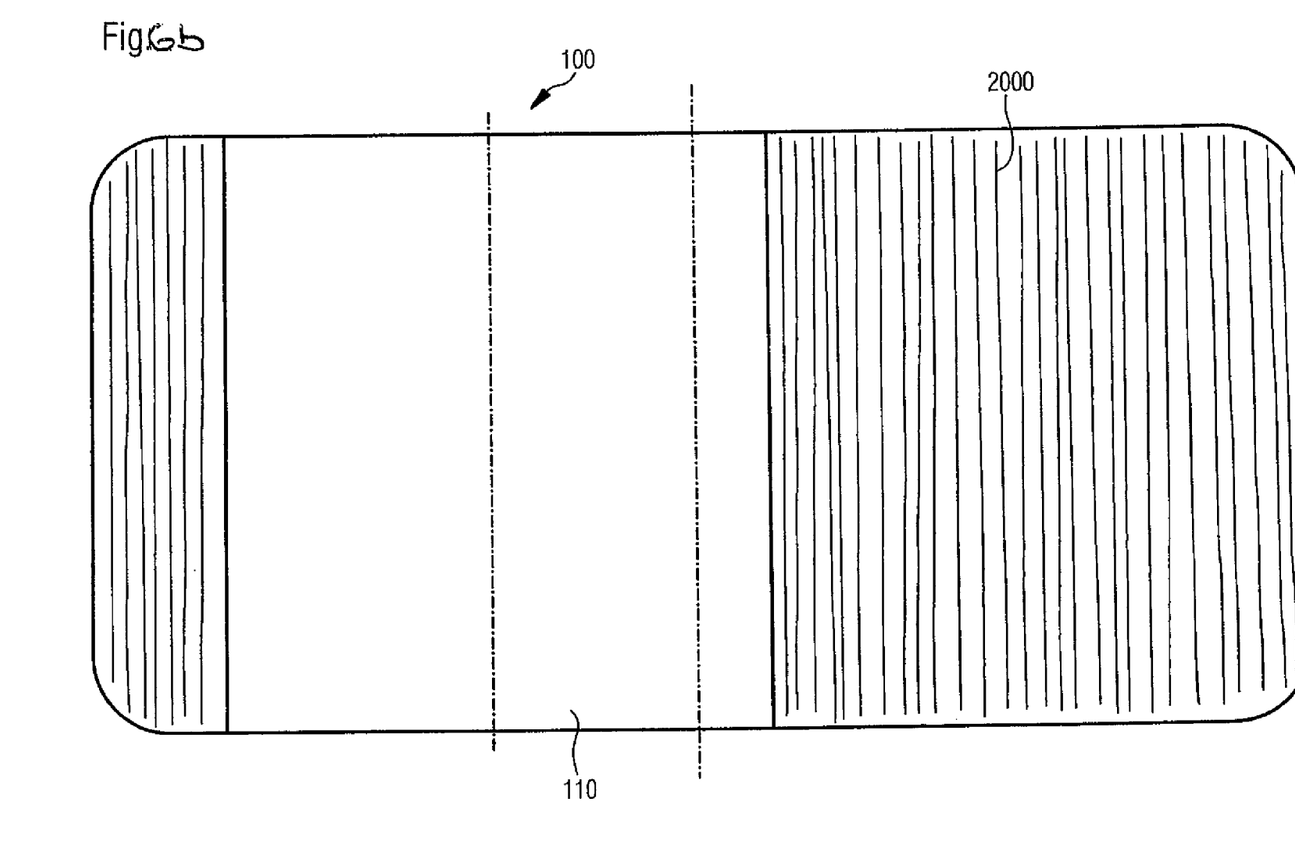

In contrast to this, FIG. 6b illustrates component 100 produced by means of machining, which is in particular a turned part. Shown again are structure-/flow lines 2000. Structure-/flow lines 2000 are essentially parallel and point into the same direction as the bar stock from which ring-shaped or respectively plate-like component 100 was produced according to the state of the art, as shown in FIG. 6b. Feedthrough opening 110 is bored out of component 100.

The invention cites a method for the first time with which a plate-like element is to be produced in a simple manner and distinguishes itself through compatibility with the metal-sealing material-feedthrough according to the state of the art, thus enabling installation in conventional ignition devices or respectively airbags. In particular it is possible with the present invention to produce metal-sealing material-feedthroughs for qualified already existing igniter devices with greater material savings. In particular a method is also cited wherein a conical feedthrough opening which is one embodiment of a feedthrough opening with means to avoid a relative movement can be produced in an especially simple manner. Moreover, a method is cited wherein a plate-like element can be produced in a simple manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A metal-sealing material-feedthrough subject to high pressures in an igniter for one of an airbag and a belt tensioning device, the metal-sealing material-feedthrough comprising:
    a base body defining an element formed by a process of cold forming and having one of a ring-shape and a plate-like shape, the element having a feedthrough opening substantially located in a center of the element and extending from a front side of the element toward a rear side of the element; and
    a metallurgic section of the base body in which there are structure-lines or flow-lines that are bent due to a reshaping process of the process of cold-forming, the base body including a relief region that is formed by a process of reshaping and the feedthrough opening being subsequently formed by a process of punching the base body.

2. The metal-sealing material-feedthrough of claim 1, wherein the relief region is formed in an area of the feedthrough opening at the rear side of the element and located on a side of the base body distal to the high pressures or the igniter.

3. The metal-sealing material-feedthrough of claim 2, wherein the relief region has a diameter that is greater than a diameter of the feedthrough opening in a region adjacent to the relief region.

4. The metal-sealing material-feedthrough of claim 2, wherein the element has an entire thickness (D) and at least one reduced thickness (DR) extending between an edge of the relief region and the front side of the element, the at least one reduced thickness (DR) being the entire thickness (D) reduced by a height (HF) of the relief region.

5. The metal-sealing material-feedthrough of claim 1, wherein the base body is formed from steel.

6. The metal-sealing material-feedthrough of claim 5, wherein the base body is formed from steel with a copper content.

7. The metal-sealing material-feedthrough of claim 6, wherein the copper content is between 1 and 5 weight %.

8. The metal-sealing material-feedthrough of claim 1, wherein the element has an essentially round outer contour formed from a cold-forming process from a wire-shaped element.

9. The metal-sealing material-feedthrough of claim 1, wherein the structure-lines or flow-lines include a plurality of serpentine shaped stress lines surrounding the relief region and the feedthrough opening.

* * * * *